United States Patent
Blandy et al.

(10) Patent No.: US 6,799,262 B1
(45) Date of Patent: Sep. 28, 2004

(54) APPARATUS AND METHOD FOR CREATING INSTRUCTION GROUPS FOR EXPLICITY PARALLEL ARCHITECTURES

(75) Inventors: Geoffrey Owen Blandy, Austin, TX (US); Andrew Johnson, Austin, TX (US); Danling Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 09/671,874

(22) Filed: Sep. 28, 2000

(51) Int. Cl.$^7$ ................................................. G06F 9/38
(52) U.S. Cl. ........................................ 712/200; 712/24
(58) Field of Search ........................... 712/200, 23, 24, 712/28, 203, 210, 215, 209

(56) References Cited

U.S. PATENT DOCUMENTS

| | | | | |
|---|---|---|---|---|
| 4,435,753 A | | 3/1984 | Rizzi ........................... | 364/200 |
| 4,642,764 A | | 2/1987 | Auslander et al. ........... | 364/300 |
| 4,782,444 A | | 11/1988 | Munshi et al. ............... | 364/300 |
| 4,833,599 A | * | 5/1989 | Colwell et al. .............. | 712/236 |
| 4,961,141 A | | 10/1990 | Hopkins et al. ............. | 364/200 |
| 5,057,837 A | | 10/1991 | Colwell et al. ............... | 341/55 |
| 5,448,746 A | * | 9/1995 | Eickemeyer et al. ........ | 712/210 |
| 5,497,499 A | * | 3/1996 | Garg et al. .................. | 712/217 |
| 5,502,827 A | | 3/1996 | Yoshida ....................... | 395/375 |
| 5,504,932 A | * | 4/1996 | Vassiliadis et al. .......... | 712/208 |

(List continued on next page.)

OTHER PUBLICATIONS

Fitzgerald et al., "Marmot: An Optimizing Compiler for Java", Microsoft Research, Jun. 16, 1999, Technical Report MSR–TR–99–33, pp. 1–29.

Azevedo et al., "Java Annotation–Aware Just–In–Time (AJIT) Compilation System", ACM 1999, San Francisco, CA, USA, pp. 142–151.

Larus et al., "SPIM S20: A MIPS R2000 Simulator", Computer Sciences Department, University of Wisconsin, Madison, copyright 1990–1997, pp. 1–25.

Aho et al., "Compilers: Principles, Techniques, and Tools", copyright 1986, Bell Telephone Labs, Inc., 4 pages.

Sinclair et al., "ASIC Design for Conditional Nested Loops with Predicate Registers", Aug. 11, 1999, Circuits and Systems, 1999, $42^{nd}$ Midwest Symposium, vol. 2, pp. 874–877.

"The Java Virtual Machine Specification", Sun Microsystems, Inc., copyright 1997, http://www.java.sun.com/docs/books/vmspec/html/Instructions2.doc14.html.

Fernandez, "Simple and Effective Link–Time Optimization of Modula–3 Programs", Nov. 7, 1994, pp. 1–7.

Ishizaki et al., Design, Implementation, and Evaluation of Optimizations in a Just–In–Time Compiler, ACM, Jun. 1999, pp. 119–122.

*Primary Examiner*—Henry W. H. Tsai
(74) *Attorney, Agent, or Firm*—Duke W. Yee; Volel Emile; Stephen J. Walder, Jr.

(57) ABSTRACT

An apparatus and method for creating instruction groups for explicitly parallel architectures is provided. The apparatus and method gather information about the underlying architecture for use in an instruction group creation phase. The information gathered includes the number of each type of execution unit available and the number of bundles that can be dispatched concurrently by the architecture. The instruction group creation of the present invention includes three phases: a first phase for performing initial grouping, a second phase for hosting instructions from further down in the program instruction order if the instruction is not able to be added during the initial grouping phase, and a third optional phase for counting the number of bundles formed to thereby inform a Just-In-Time compiler of the amount of space need to be allocated in a code buffer.

39 Claims, 10 Drawing Sheets

U.S. PATENT DOCUMENTS

| | | | | |
|---|---|---|---|---|
| 5,574,928 A | | 11/1996 | White et al. ................. | 395/800 |
| 5,600,810 A | | 2/1997 | Ohkami ....................... | 395/567 |
| 5,613,121 A | | 3/1997 | Blainey ....................... | 395/709 |
| 5,627,981 A | | 5/1997 | Adler et al. ................. | 395/582 |
| 5,628,016 A | | 5/1997 | Kukol ......................... | 395/704 |
| 5,634,023 A | | 5/1997 | Adler et al. ................. | 395/591 |
| 5,669,001 A | | 9/1997 | Moreno ....................... | 395/706 |
| 5,748,936 A | | 5/1998 | Karp et al. .................. | 395/394 |
| 5,761,470 A | | 6/1998 | Yoshida ....................... | 395/386 |
| 5,768,510 A | | 6/1998 | Gish ........................ | 395/200.33 |
| 5,778,219 A | | 7/1998 | Amerson et al. ........... | 395/591 |
| 5,812,850 A | | 9/1998 | Wimble ....................... | 395/704 |
| 5,819,058 A | | 10/1998 | Miller et al. ................. | 395/386 |
| 5,826,054 A | | 10/1998 | Jacobs et al. ............... | 395/389 |
| 5,828,886 A | | 10/1998 | Hayashi ....................... | 395/709 |
| 5,848,246 A | | 12/1998 | Gish ........................ | 395/200.58 |
| 5,922,065 A | * | 7/1999 | Hull et al. .................... | 712/24 |
| 5,966,537 A | | 10/1999 | Ravichandran ............. | 395/709 |
| 6,018,799 A | | 1/2000 | Wallace et al. ............. | 712/300 |
| 6,035,120 A | | 3/2000 | Ravichandran ............. | 395/705 |
| 6,041,399 A | | 3/2000 | Terada et al. ................ | 712/24 |
| 6,061,781 A | | 5/2000 | Jain et al. .................... | 712/221 |
| 6,101,592 A | | 8/2000 | Pechanek et al. ........... | 712/20 |
| 6,108,771 A | | 8/2000 | Gaertner et al. ............. | 712/217 |
| 6,110,226 A | | 8/2000 | Bothner ........................ | 717/7 |
| 6,151,703 A | | 11/2000 | Crelier ......................... | 717/5 |
| 6,158,048 A | | 12/2000 | Lueh et al. .................... | 717/9 |
| 6,237,077 B1 | | 5/2001 | Sharangpani et al. ......... | 712/24 |
| 6,240,510 B1 | * | 5/2001 | Yeh et al. ................... | 712/236 |
| 6,286,135 B1 | | 9/2001 | Santhanam ................... | 717/9 |
| 6,286,346 B1 | | 9/2001 | Hocken, Jr. et al. .......... | 70/260 |
| 6,301,705 B1 | | 10/2001 | Doshi et al. ................... | 717/9 |
| 6,311,325 B1 | | 10/2001 | Levine et al. .................. | 717/4 |
| 6,317,872 B1 | | 11/2001 | Gee et al. ...................... | 717/7 |
| 6,317,876 B1 | | 11/2001 | Kunz et al. .................... | 717/9 |
| 6,321,322 B1 | | 11/2001 | Pechanek et al. ............. | 712/24 |
| 6,324,687 B1 | | 11/2001 | Beadle et al. .................. | 717/6 |
| 6,336,213 B1 | | 1/2002 | Beadle et al. .................. | 717/5 |
| 6,339,841 B1 | | 1/2002 | Merrick et al. ................ | 717/10 |
| 6,385,660 B2 | | 5/2002 | Griesemer et al. ........... | 709/315 |
| 6,408,433 B1 | | 6/2002 | Click, Jr. et al. ............. | 717/154 |
| 6,412,105 B1 | | 6/2002 | Maslennikov et al. ......... | 717/9 |
| 6,427,234 B1 | | 7/2002 | Chambers et al. ............ | 717/140 |
| 6,442,676 B1 | | 8/2002 | Guenthner ................. | 712/210 |
| 6,446,195 B1 | | 9/2002 | Ganapathy et al. ......... | 712/221 |
| 6,466,972 B1 | * | 10/2002 | Paul et al. ................... | 709/222 |
| 6,487,601 B1 | * | 11/2002 | Hubacher et al. .............. | 713/2 |
| 6,507,946 B2 | | 1/2003 | Alexander, III et al. .... | 717/145 |
| 6,513,109 B1 | | 1/2003 | Gschwind et al. ........... | 712/200 |
| 6,539,473 B1 | * | 3/2003 | Hubacher et al. .............. | 713/2 |
| 6,560,624 B1 | | 5/2003 | Otani et al. .................. | 708/655 |
| 6,567,974 B1 | | 5/2003 | Czajkowski ................. | 717/151 |
| 6,571,385 B1 | | 5/2003 | Muthukumar et al. ...... | 717/150 |
| 6,604,167 B1 | | 8/2003 | Blandy et al. ............... | 711/100 |
| 6,615,403 B1 | | 9/2003 | Muthukumar et al. ...... | 717/160 |
| 6,622,234 B1 | | 9/2003 | Pechanek et al. ............. | 712/22 |
| 6,622,238 B1 | | 9/2003 | Benjamin et al. ........... | 712/226 |
| 6,640,313 B1 | * | 10/2003 | Quach ......................... | 714/10 |
| 6,640,315 B1 | | 10/2003 | Hwu et al. .................... | 714/17 |
| 6,675,375 B1 | | 1/2004 | Czajkowski ................. | 717/151 |

* cited by examiner

| TEMPLATE | SLOT 0 | SLOT 1 | SLOT 2 |
|---|---|---|---|
| 00 | M-unit | I-unit | I-unit |
| 01 | M-unit | I-unit | I-unit |
| 02 | M-unit | I-unit | I-unit |
| 03 | M-unit | I-unit | I-unit |
| 04 | M-unit | L-unit | X-unit |
| 05 | M-unit | L-unit | X-unit |
| 06 | | | |
| 07 | | | |
| 08 | M-unit | M-unit | I-unit |
| 09 | M-unit | M-unit | I-unit |
| 0A | M-unit | M-unit | I-unit |
| 0B | M-unit | M-unit | I-unit |
| 0C | M-unit | F-unit | I-unit |
| 0D | M-unit | F-unit | I-unit |
| 0E | M-unit | M-unit | F-unit |
| 0F | M-unit | M-unit | F-unit |
| 10 | M-unit | I-unit | B-unit |
| 11 | M-unit | I-unit | B-unit |
| 12 | M-unit | B-unit | B-unit |
| 13 | M-unit | B-unit | B-unit |
| 14 | | | |
| 15 | | | |
| 16 | B-unit | B-unit | B-unit |
| 17 | B-unit | B-unit | B-unit |
| 18 | M-unit | M-unit | B-unit |
| 19 | M-unit | M-unit | B-unit |
| 1A | | | |
| 1B | | | |
| 1C | M-unit | F-unit | B-unit |
| 1D | M-unit | F-unit | B-unit |
| 1E | | | |
| 1F | | | |

FIG. 3A

```
/*------------------------------------+/
| Add this instruction to the current instruction group chain and
| increment appropriate type counter for group.
+------------------------------------*/
Types ALL++;
switch (ipt->inst_type) {
  case TypeA:
        TypesA++;
        TypesMIA++;
        break;
  case TypeM0:
        M0=1;
  case TypeM:
        TypesM++;
        TypesMIA++;
        break;
  case TypeI0:
        I0=1;
  case TypeI:
        TypesI++;
        TypesFIB++;
        TypesMIA++;
        break;
  case TypeB:
        TypesB++;
        if (typesB < 2)
           TypesFIB++;
        break;
  case TypeF0:
        F0=1;
  case TypeF:
        TypesF++;
        TypesFIB++;
        break;
  case TypeLI:
        TypesF++;
        TypesI++;
        TypesFIB+=2;
        TypesMIA++;
        TypesALL++;
        break;
  default;
        break;
}
```

FIG. 3B

```
/*------------------------------------------+/
| check to see if there are sufficient hardware resources to include
| the current instruction in the current instruction group.
|
| MAX_DISPERSAL is the total number slots available in the dispersal
| window. For Itanium MAX_DISPERSAL=6;
|
| MIA_CAPACITY is the total available slots that can hold any
| combination of M,I and A instructions. For Itanium MIA_CAPACITY=4
|
| FIB_CAPACITY is the total available slots that can hold any
| combination of F,I and B instructions. For Itanium FIB_CAPACITY=4
| For the special case where there are 3 TypeB instructions FIB_CAPACITY
| is actually 5 (MFI BBB or MII BBB). This is handled by not incrementing
| TypesFIB for a TypeB instruction if there are already 2 TypeBs (see FIG A)
|
| For Itanium: M_UNITS=2, I_UNITS=2, F_UNITS=2, B_UNITS=3
+------------------------------------------*/
if (noMoreInstructions OR TypesALL == MAX_DISPERSAL){
  goto stopIG;
}
switch (instruction_type) {
 case TypeA:
  if (TypesMIA == MIA_CAPACITY)
        goto CheckFloat;
  break;
 case TypeM0:
  if (M0)
        goto Phase2;
 case TypeM:
  if (TypesMIA == MIA_CAPACITY)
        goto CheckFloat;
  if (TypesM == M_UNITS)
        goto Phase2;
  break;
 case TypeI0:
  if (I0)
        goto Phase2;
 case TypeI:
  if (TypesMIA == MIA_CAPACITY)
        goto CheckFloat;
  if (TypesI == I_UNITS)
        goto Phase2;
  if (TypesFIB == FIB_CAPACITY)
        goto Phase2;
  break;
```

FIG. 3C

```
case TypeB:
 if (TypesB == B_UNITS)
        goto Phase2;
 if (TypesFIB == FIB_CAPACITY)
        goto Phase2;
/*----------------------------------+/
    | Because branches will only appear in the final bundle of an
 | instruction group, we cannot accomodate 2 TypeFs and 2 TypeBs.
 | MFB MFB is not allowed.
 +----------------------------------*/
 if (TypesB && (TypesF == F_UNITS))
        goto Phase2;
 break;
case TypeF0:
 if (F0)
        goto Phase2;
case TypeF:
 if (TypesF == F_UNITS)
        goto Phase2;
 if (TypesFIB == FIB_CAPACITY)
        goto Phase2;
 break;
case TypeLI:
 if (TypesALL == 5)
goto Phase2;
            if (TypesMIA == MIA_CAPACITY)
                goto CheckFloat;
            if (TypesF == F_UNITS)
                goto Phase2;
            if (TypesI == I_UNITS)
                goto Phase2;
         /*----------------------------------+/
         | LI would add both an F and an I type so we need extra capacity
         +----------------------------------*/
            if (TypesFIB>=(FIB_CAPACITY-1))
                goto Phase2;
            break;
         default:
            break;
    }
```

FIG. 3D

```
/*------------------------------------+/
| If we have the maximum possible M,I and A instructions check to see if the
| Method contains floating point instructions. If so, try to hoist. Otherwise
| there in nothing to hoist so skip Phase 2 and go directly to Phase 3.
+------------------------------------*/
Check Float:
        if(MethodContainsFloats)
            goto Phase2
        else
            goto Phase3

/*------------------------------------+/
| check to see if there are sufficient hardware resources to HOIST the
| current instruction in the current instruction group.
+------------------------------------*/
switch (instruction_type) {
  case TypeA:
    if(TypesMIA == MIA_CAPACITY)
            continue;
    /*-------+/
    | Add to group
    +--------*/
    TypesA++;
    TypesMIA++;
    break;
  case TypeM0:
    if (M0)
            continue;
    M0=1;
  case TypeM:
    if (TypesM == M_UNITS)
            continue;
    if (TypesMIA == MIA_CAPACITY)
            continue;
```

FIG. 3E

```
/*-------+/
|Add to group
+--------*/
TypesM++;
TypesMIA++;
break;
case TypeI0:
    if (I0)
          continue;
    I0=1;
case TypeI:
    if (TypesI == I_UNITS)
          continue;
    if (TypesMIA == MIA_CAPACITY)
          continue;
    if (TypesFIB == FIB_CAPACITY)
          continue;
/*-------+/
|Add to group
+--------*/
TypesI++;
TypesMIA++;
TypesFIB++;
break;
/*---------------------------------------+/
 | The preferred embodiment does not hoist branches
 +---------------------------------------*/
    case TypeB:
       continue;

case TypeF0:
        if (F0)
              continue;
        F0=1;
    case TypeF:
        if ( (noHoistFlt))
              continue;
        if (TypesF == F_UNITS)
              continue;
        if (TypesFIB == FIB_CAPACITY)
              continue;
```

```
/*-------+/
|Add to group
+--------*/
TypesF++;
TypesFIB++;
break;
caseTypeLI:
    if (TypesALL == 5)
            continue;
    if (TypesF == F_UNITS)
            continue;
    if (TypesI == I_UNITS)
            continue;
    if (TypesFIB>=(FIB_CAPACITY-1))
            continue;
    if (TypesMIA == MIA_CAPACITY)
            continue;
    /*-------+/
    |Add to group
    +--------*/
    TypesF++;
    TypesI++;
    TypesMIA++;
    TypesALL++;
    TypesFIB+=2;
    break;

default:
            break;
}
TypesALL++;
```

Determining Bundle Count

```
/*-------------------------------------------+/
|For Itanium we will have either 1 or two Bundles.
+-------------------------------------------*/
if (TypesB) {
    /*-------------------------------------------+/
    | If we have a single B instruction we will require an extra bundle if
    | we do not have an M or an A instruction and have a total of 2 F+I
    | instructions as there is no FIB template.
    +-------------------------------------------*/
    if (typesB == 1) {
        if ((TypesM +     TypesA == 0) && (TypesF+TypesI) == 2){
            bundleCt++;
        }
}
```

```
/*------------------------------------------+/
 | If we have 2 B instructions the final bundle will be MBB
 +------------------------------------------*/
 } else if (TypesB == 2) {
         /*------------------------------------------+/
          | If we have an M or an A and we have only 3 total we have 1 bundle: MBB
          | Otherwise if we have any non-B instruction (TypesALL>2) we will need
          | 2 bundles.
          +------------------------------------------*/
         if (TypesM || TypesA){
           if (TypesALL >3);
             bundleCt+=2;
           else
             bundleCt++;
         } else {
           if (TypesALL >2);
             bundleCt+=2;
           else
             bundleCt++;
         }
 /*------------------------------------------+/
 | With 3 B instructions, the final bundle will be BBB
 +------------------------------------------*/
 } else {     // 3 TypesB
         If (TypesALL >3)
             bundleCt+=2;
         else
             bundleCt++;
 }
 /*------------------------------------------+/
 | If we have no branch instructions:
 |       If 4 or more slots we need 2 bundles
 |       If 2 Fs we need two bundles (there is no bundle that includes  2 F slots)
 |       If TypesF+TypesI > 2 we need two bundles (need an M or  A for each 2 F/I)
 +------------------------------------------*/
 } else {
   if (TypesALL > 3 || TypesF > 1 || (TypesF+TypesI) > 2)
         bundleCt+=2;
   else
         bundleCt++;
 }
}
```

APPARATUS AND METHOD FOR CREATING INSTRUCTION GROUPS FOR EXPLICITY PARALLEL ARCHITECTURES

RELATED APPLICATIONS

The present invention is related to commonly assigned and co-pending U.S. patent application Ser. No. 09/671,876 entitled "APPARATUS AND METHODS FOR IMPROVED DEVIRTUALIZATION OF METHOD CALLS", Ser. No. 09/671,770 entitled "APPARATUS AND METHOD FOR AVOIDING DEADLOCKS IN A MULTI-THREADED ENVIRONMENT", Ser. No. 09/671,773 entitled "APPARATUS AND METHOD FOR IMPLEMENTING SWITCH INSTRUCTIONS IN AN IA64 ARCHITECTURE", Ser. No. 09/671,877 entitled "APPARATUS AND METHOD FOR DETECTING AND HANDLING EXCEPTIONS", Ser. No. 09/671,771 entitled "APPARATUS AND METHOD FOR VIRTUAL REGISTER MANAGEMENT USING PARTIAL DATA FLOW ANALYSIS FOR JUST-IN-TIME COMPILATION", Ser. No. 09/671,873 entitled "APPARATUS AND METHOD FOR AN ENHANCED INTEGER DIVIDE IN AN IA64 ARCHITECTURE", Ser. No. 09/671,875 entitled "APPARATUS AND METHOD FOR CREATING INSTRUCTION BUNDLES IN AN EXPLICITLY PARALLEL ARCHITECTURE", filed on even date herewith and hereby incorporated by reference.

BACKGROUND OF THE INVENTION

1. Technical Field

The present invention is directed to an apparatus and method for rapidly creating instruction groups for explicitly parallel architectures. More particularly, the present invention is directed to an apparatus and method for creating instruction groups for the IA64 architecture.

2. Description of Related Art

Explicitly parallel architectures, such as IA64, require the compiler (or assembler programmer) tog identify instructions that can be run safely in parallel. A group of such instructions is called an instruction group. IA64 allows instruction groups of arbitrary size and theoretically all instructions within the group could be executed concurrently. However, any given implementation of the architecture, e.g., Itanium, has resource restrictions that limit the number and types of instructions that can be executed in parallel. Such restrictions include the number and type of execution units and the number of instruction packages (bundles) that can be dispatched concurrently.

For static compilers, long compile times are undesirable but minimizing compile time usually is not of paramount importance. However, dynamic or Just-In-Time compilers may become unusable if their compile times are elongated. Because the compilation typically occurs during the invocation of a method/function, compile time becomes a direct component of response time.

Thus, it would be beneficial to have an apparatus and method for quickly creating instruction groups that will maximize instruction level parallelism for any given implementation of an explicitly parallel architecture, and in particular IA64 architectures.

SUMMARY OF THE INVENTION

The present invention provides a mechanism by which instruction groups may be rapidly formed during the compilation of a computer program. With the present invention, it is assumed that a previous compilation phase has generated a stream of intermediate instructions that represents instructions that are arranged in natural program order. The intermediate instructions identify the instruction type and identify all sources and target registers. Additionally, each instruction has a "hoist" field that is initialized to zero.

With the present invention, prior to performing the instruction group creation, the apparatus and method of the present invention gathers information about the underlying architecture for use in the instruction group creation phase. The information gathered includes the number of each type of execution unit available and the number of bundles that can be dispatched concurrently by the architecture.

The instruction group creation of the present invention includes three phases: a first phase for performing initial grouping, a second phase for hosting instructions from further down in the program instruction order if the instruction is not able to be added during the initial grouping phase, and a third optional phase for counting the number of bundles formed to thereby inform a Just-In-Time compiler of the amount of space need to be allocated in a code buffer. Other features and advantages of the present invention will be described in, or will become apparent in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
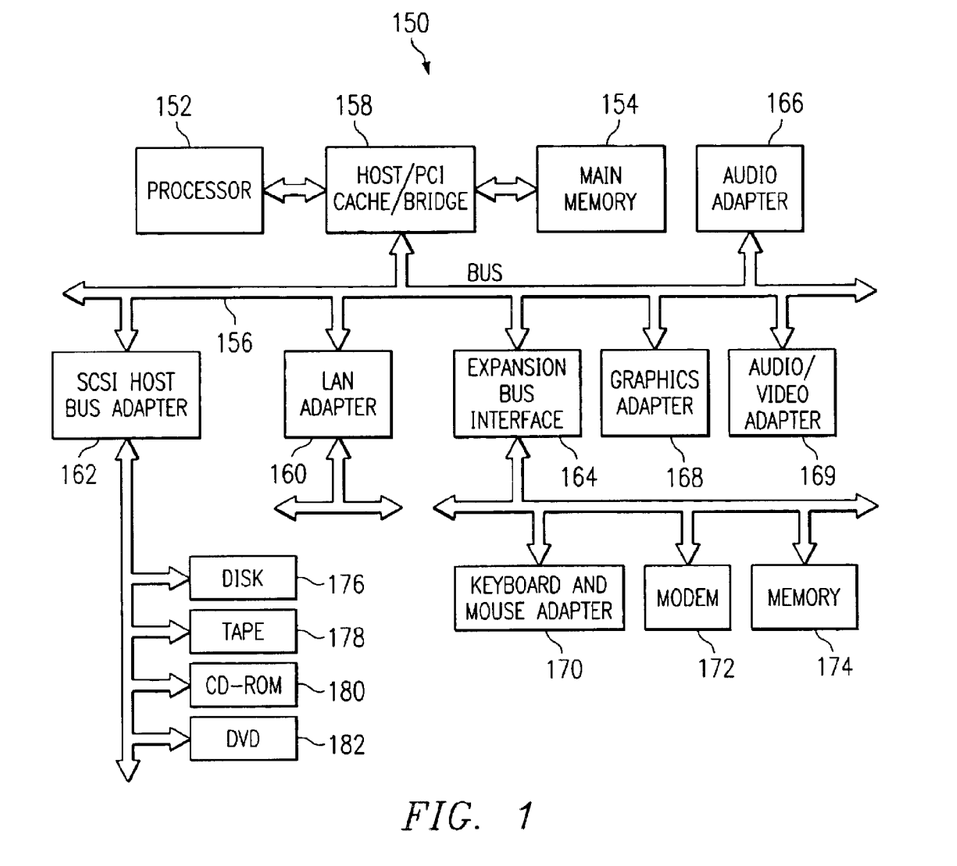
FIG. 1 is an exemplary block diagram of a data processing system according to the present invention.

With reference now to the figures, and in particular FIG. 1, a block diagram of a data processing system in which the present invention may be implemented is illustrated. Data processing system 250 is an example of a client computer, however, the present invention may be implemented in a server, stand-alone computing device, or the like. In short, the present invention may be implemented in any data processing device having an explicitly parallel architecture. By explicitly parallel architecture, what is meant is that the compiler or programmer is responsible for designating which instructions may be executed in parallel. The architecture provides a means for the compiler to identifying such groups of instructions. For example, in the IA64 architecture, described in greater detail hereafter, the stop bits provide this means for identifying groups of instructions.

Data processing system 150 employs a peripheral component interconnect (PCI) local bus architecture. Although the depicted example employs a PCI bus, other bus architectures such as Micro Channel and ISA may be used. Processor 152 and main memory 154 are connected to PCI local bus 156 through PCI Bridge 158. PCI Bridge 158 also may include an integrated memory controller and cache memory for processor 152. Additional connections to PCI local bus 156 may be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 169 are connected to PCI local bus 166 by add-in boards inserted into expansion slots. Expansion bus interface 164 provides a connection for a keyboard and mouse adapter 170, modem 172, and additional memory 174. SCSI host bus adapter 162 provides a connection for hard disk drive 176, tape drive 178, and CD-ROM 180 in the depicted example. Typical PCI local bus implementations will support three or four PCI expansion slots or add-in connectors.

An operating system runs on processor 152 and is used to coordinate and provide control of various components within data processing system 150 in FIG. 1. The operating system may be a commercially available operating system such as OS/2, which is available from International Business Machines Corporation.

An object oriented programming system such as Java may run in conjunction with the operating system and may provide calls to the operating system from Java programs or applications executing on data processing system 150. Instructions for the operating system, the object oriented operating system, and applications or programs are located on storage devices, such as hard disk drive 176 and may be loaded into main memory 154 for execution by processor 152. Hard disk drives are often absent and memory is constrained when data processing system 150 is used as a network client.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to a multiprocessor data processing system.

The present invention provides an apparatus and method for rapidly creating instruction groups for explicitly parallel architectures. In particular, the present invention provides an apparatus and method for creating instruction groups for implementations of the IA64 explicitly parallel architecture. The IA64 architecture is described in the "Intel IA-64 Architecture Software Developer's Manual" available for download from http://developer.intel.com/design/Ia-64/downloads /24531702s.htm, which is hereby incorporated by reference. While the present invention will be described with reference to the Itanium implementation of the IA64 architecture, the present invention is not limited to such. Rather, the present invention is applicable to any explicitly parallel architecture and any implementation of the IA64 architecture in particular.

An IA64 program consists of a sequence of instructions and stops packed in bundles. A bundle is 128 bits in size and contains 3 41-bit instruction slots and a 5 bit template. The template maps the instruction slots to the execution units to which they will be dispatched and identifies instruction group stops within the bundle. A bundle need not include any instruction group stops in which case the three instructions may be executed in parallel with some or all the instructions of the next bundle.

Figure 2:
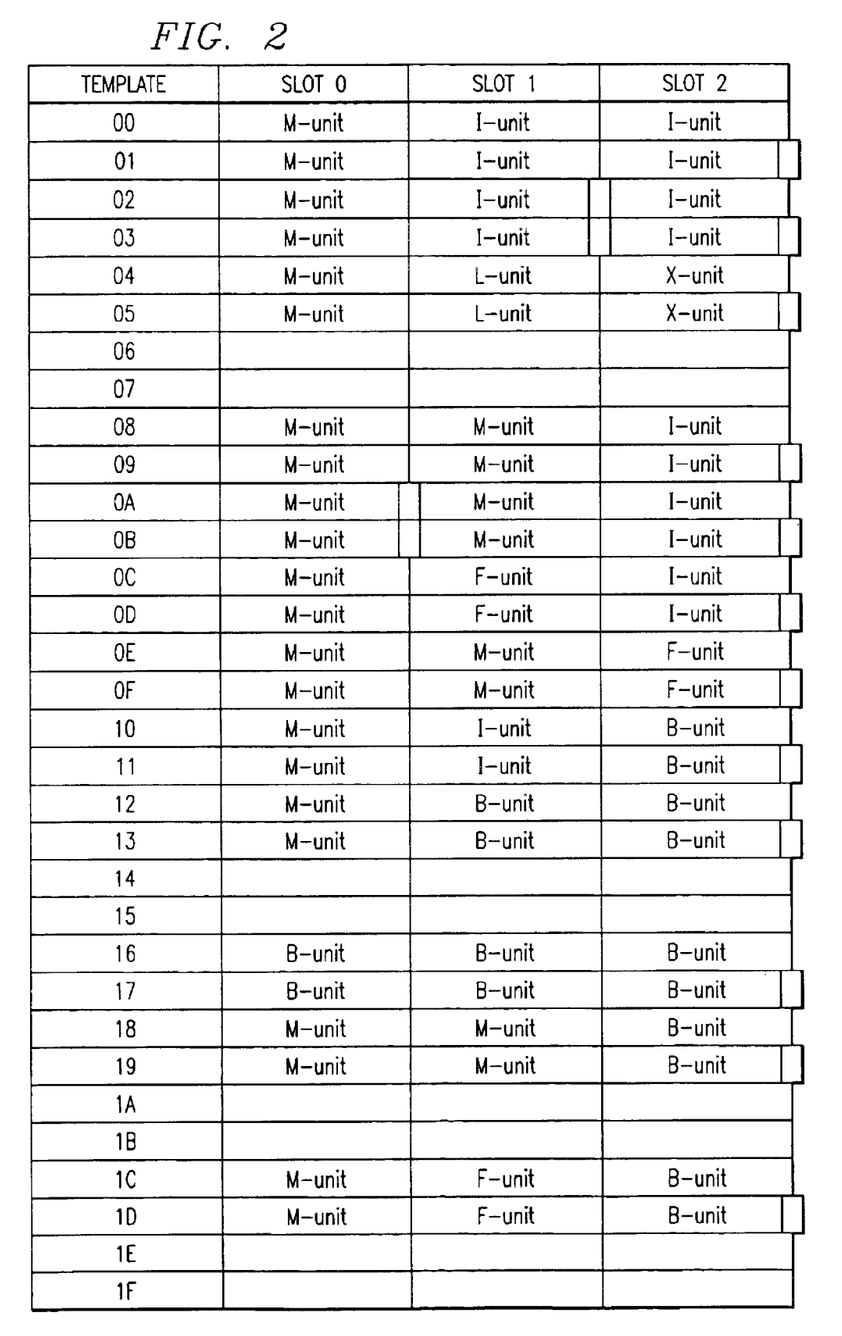
FIG. 2 is an exemplary diagram illustrating template field encoding and instruction slot mapping in accordance with an IA64 architecture.

FIG. 2 is an exemplary diagram illustrating instruction slots and template maps in accordance with the present invention. The double vertical lines in the figure represent stops which may be at the end of a bundle or at an intermediate point in the bundle.

An instruction group is a sequence of instructions starting at a given bundle address and slot number and including all instructions at sequentially increasing slot numbers and bundle addresses up to the first stop, taken branch, or fault. In IA64, instructions may be of six different types:

1) A, Integer Arithmetic Logic Unit (ALU);
2) I, Non-ALU Integer;
3) M, Memory;
4) F, Floating-point;
5) B, Branch; and
6) LX, Long immediate (this is used for generating 64 bit constants and long branches/calls although the latter is not implemented on Itanium).

IA64 execution units may be of four different types:

1) Integer (I-unit), which can execute A, I and LX instructions;
2) Memory (M-unit), which can execute M and A instructions;
3) Floating-point (F-unit), which can execute F instructions; and
4) Branch (B-unit), which can execute B instructions.

In addition, some implementations of IA64 may have asymmetric implementations of their execution units. For example, Itanium has 2 I-units but only the first, I-0, can execute the full compliment of I and A type instructions. The second, I-1, cannot execute instructions such as extr and tbit. To insure that the asymmetric units are not oversubscribed, instructions that only can be executed in the first execution unit will be designated as type M0, I0 and F0. The same scheme could be applied to instructions that could only be executed by e-unit n, although no implementation of IA64 that where n is not 0 currently exist. In view of the above architecture, and resource limitations of the Itanium implementation of the IA64 architecture, certain combinations of instructions may be grouped for efficient parallel execution by the IA64 architecture execution units.

Table 1 shows the various instruction combinations that can comprise a bundle in the current version of the IA64 architecture. Note that the LX instruction occupies two slots.

TABLE 1

Currently Supported Bundles

| | |
|---|---|
| MMF | Memory, Memory, Floating-point |
| MLX | Memory, Long immediate |
| MMI | Memory, Memory, Integer |
| MII | Memory, Integer, Integer |
| MFI | Memory, Floating-point, Integer |
| MMB | Memory, Memory, Branch |
| MFB | Memory, Floating-point, Branch |
| MIB | Memory, Integer, Branch |
| MBB | Memory, Branch, Branch |
| BBB | Branch, Branch, Branch |

The present invention provides a mechanism by which instruction groups may be formed during the compilation of a computer program. With the present invention, it is assumed that a previous compilation phase has generated a stream of intermediate instructions that represents IA64 instructions that are arranged in natural program order. The intermediate instructions identify the instruction type (A, I, M, F, B, or LX and M0, I0, F0 for Itanium) and identify all source and target registers. Additionally, each instruction has a "hoist" field that is initialized to zero. The "hoist" field will be described in greater detail hereafter.

With the present invention, prior to performing the instruction group creation, the apparatus and method of the present invention gathers information about the underlying architecture for use in the instruction group creation phase. The information gathered includes the number of each type of execution unit available (including asymmetricity) and the number of bundles that can be dispatched concurrently by the architecture (dispersal window). For example, Itanium has 2 I-units, 2 M-units, 2 F-units, and 3 B-units and can dispatch a maximum of 2 bundles concurrently (dispersal window of 2 bundles). Additionally, for Itanium, only one of two execution units can execute the type 0 instructions (M0, I0, F0).

For a dynamic (or Just In Time) compiler the processor type may be ascertained by examining the CPUID registers and the number of available units and dispersal width can be adjusted during compiler initialization. For a static compiler, the target processor may be specified as compiler option.

Counters are used to track the hardware resource utilization of the current instruction group. For Itanium the following counters are used: TypesM, TypesI, TypesA, TypesF, TypesB, TypesMIA, TypesFIB, TypesALL. The latter three counters provide an efficient way to track collections of instruction types. For example TypesMIA will hold the total number of M, I and A instructions. The justification for their use is detailed below. Additionally, bitflags are used to indicate the inclusion of M0, I0 and F0 instructions. When an instruction is added to the instruction group, two or more counters will be incremented based on the instruction type. For example when an LX instruction is added, the TypesF, TypesI, TypesMIA, TypesFIB, and TypesALL counters are incremented (TypesAll is incremented twice). When an F0 instruction is added, TypesF ,TypseFIB and TypesALL are incremented and the F0 bitflag is set. Note that IA64 processors can perform multiple adds concurrently and therefore it will typically take no more cycles to increment multiple counters than to increment a single counter. The alternative of summing individual counters prior to doing a compare involves read after write dependencies that would require the sum to take several extra cycles. The counters are cleared at the start of each instruction group.

Once the architecture limitation information is obtained, instruction group creation may begin. Instruction group creation is comprised of three phases: Phase 1—Initial grouping; Phase 2—Attempt to hoist subsequent instructions into a current instruction group; and Phase 3—Determine bundle count.

Phase 1

In phase 1, initial grouping of instructions is performed. The initial grouping is performed based on processor resource availability and instruction dependencies. During this process instructions may be encountered that have been tagged for inclusion in a previous instruction group, as described in Phase 2 below. When such an instruction is encountered, it is hoisted into the designated instruction group but otherwise ignored.

The initial grouping consists of first determining if there are any available execution units and if the dispersal window has available slots. If not, the operation skips to phase 3 where the number of bundles are counted. In other words, no further instructions can be added to the instruction group since there are no additional hardware resources to handle the instruction. The exhaustion of hardware resources signifies the end of an instruction group.

If the hardware resources are not saturated, a determination is made as to whether there are hardware resources available to execute the candidate instruction. If not the operation skips to Phase 2. For example, on Itanium, if the candidate instruction is of type M and the current instruction group already contains 2 type M instructions, the candidate instruction will be excluded from the current group.

If there are hardware resources available, the initial grouping includes determining if there are any inter-instruction dependencies that preclude the instruction from being executed in parallel with other instructions in the current instruction group. This determination is based on the detection of read after write (RAW) dependencies. For example, an instruction that has a source register that was loaded by an instruction already within the group has a RAW dependency and must not be included in the current instruction group. The details of determining these dependencies are well known among those of ordinary skill in the art and will not be described in detail here. However, there is an unique optimization introduced by this invention and described below.

One way to track register usage is to use an array of fields, one field for each virtual register, to indicate if the register has been used as a target in the current instruction group. Such an array would be cleared to zero at the beginning of each instruction group. When the register is used as a target the corresponding field is set to one. When a register is used as a source, the field is examined. If the value is zero, the instruction may be included in the group, otherwise, the instruction is excluded from the group.

The problem with this approach is that it requires clearing the fields at the onset of each instruction group. This problem would be minimized if the fields were bit fields (all that is required to represent 1 or 0). However, nearly all computer architectures, IA64 included, make it cumbersome to access bit fields. Far more instructions are required to access bit fields than byte fields and so the normal trade-off is to use an array of byte fields. In that a single method may have thousands of virtual registers and hundreds of instruction groups, the clearing of these fields is problematic.

The solution introduced by the present invention includes a byte array and an eight bit instruction group counter which is initially set to one. The byte array is cleared at the beginning of compilation and when the instruction group counter wraps to 0 at which point the counter is set to 1 after the clearing. When each new instruction group is encountered, the instruction group counter is incremented. When a target register is encountered, the corresponding byte is set to the instruction group counter. When a source register is encountered, a check is made to see if the corresponding byte is equal to the instruction group counter. If equal the instruction is excluded from the current instruction group. Note that this solution requires clearing the array only 1/255 of the time of the standard solution.

When determining if there are any additional execution units available or if the dispersal window is full, if there are no further hardware resources available, the instruction group is identified as being saturated and the instruction is not added to the instruction group. Otherwise, if there are additional resources available, the operation of phase 1 is repeated.

Phase 2

If in phase 1, an instruction cannot be added to the current instruction group and hardware resources have not yet been saturated, an instruction from further down in the program instruction order may be able to be "hoisted" into the current instruction group in phase 2. To reduce compile time, only a limited number of down stream instructions are examined. If that limit is reached the search terminates and control is passed to Phase 3. Within the limit, each instruction is examined and a determination is made as to whether there are any RAW or write after read (WAR) dependencies that restrict the instruction from being added to the current instruction group. If not a determination is made as to whether hardware resources are available to include this instruction in the current group.

Then, a determination is made as to whether an invoke instruction exists between the candidate instruction and the instructions in the current instruction group. An invoke instruction is an instruction that invokes another program segment, such as a method. If an invoke boundary has been crossed and the candidate instruction has one or more registers that would be required to be changed to non-volatile from volatile as a result of its inclusion in the current instruction group, and the instruction has not been tagged for inclusion in an earlier instruction group, the current instruction is tagged for inclusion in the current instruction group by setting it's hoist field to the current instruction group.

The instruction is not immediately added to the instruction group in order to avoid introduction of additional non-volatile registers. However, the hardware resource counters are incremented to indicate that the instruction has been included. If a later instruction group can hoist the instruction without increasing the number of non-volatile registers, it will become a member of that group rather than the earlier group.

Otherwise, if no invoke boundary has been crossed, the instruction is added to the instruction group. Thereafter, if the number of instructions examined in phase 2 is equal to the predetermined threshold or the hardware resources have been saturated, the operation continues to phase 3. Otherwise, the operation is repeated for the next instruction down in the program instruction order.

Regardless of whether an instruction is selected for inclusion, its register and storage utilization is logged so that RAW and WAR dependencies can accurately be detected for subsequent instructions.

Phase 3

Phase 3 is used to determine the number of bundles that have been created using the instruction grouping creation operation of the present invention. The number of bundles is used by the Just-In-Time compiler to determine the amount of space to allocate in the code buffer. For static compilers, this step may be omitted.

Figure 3A:
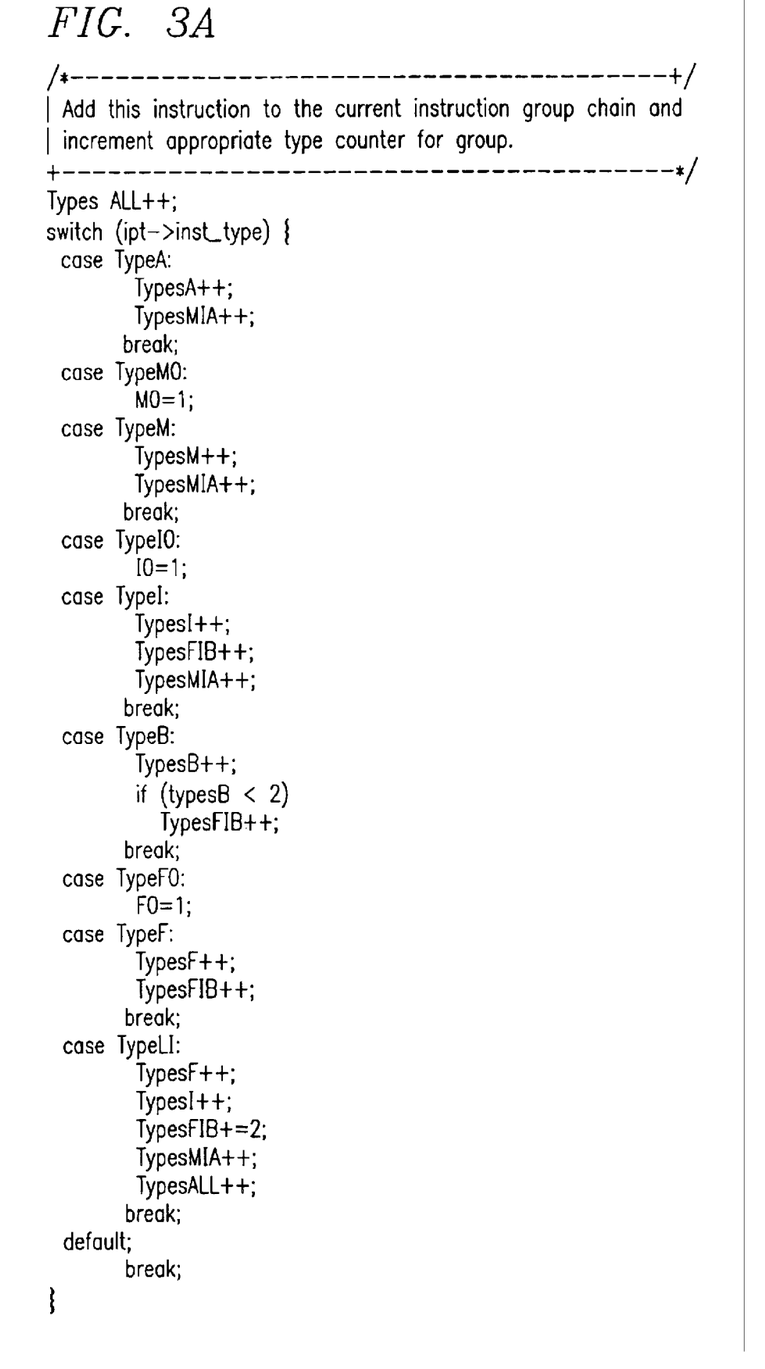
FIGS. 3A–3G are diagrams illustrating pseudo-code for creating instruction groups for an explicitly parallel architecture in accordance with the present invention.
Figure 3B:
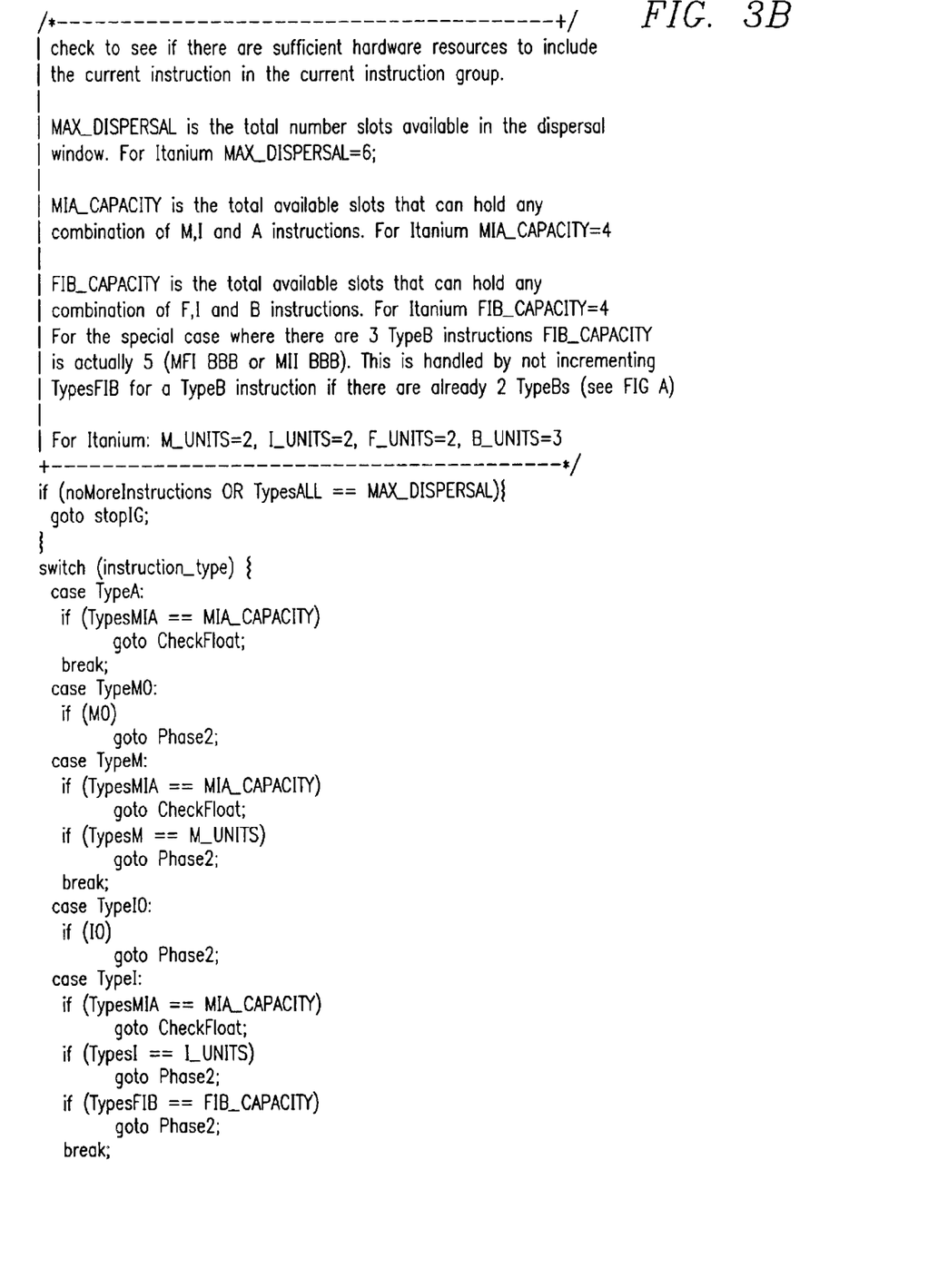
Figure 3C:
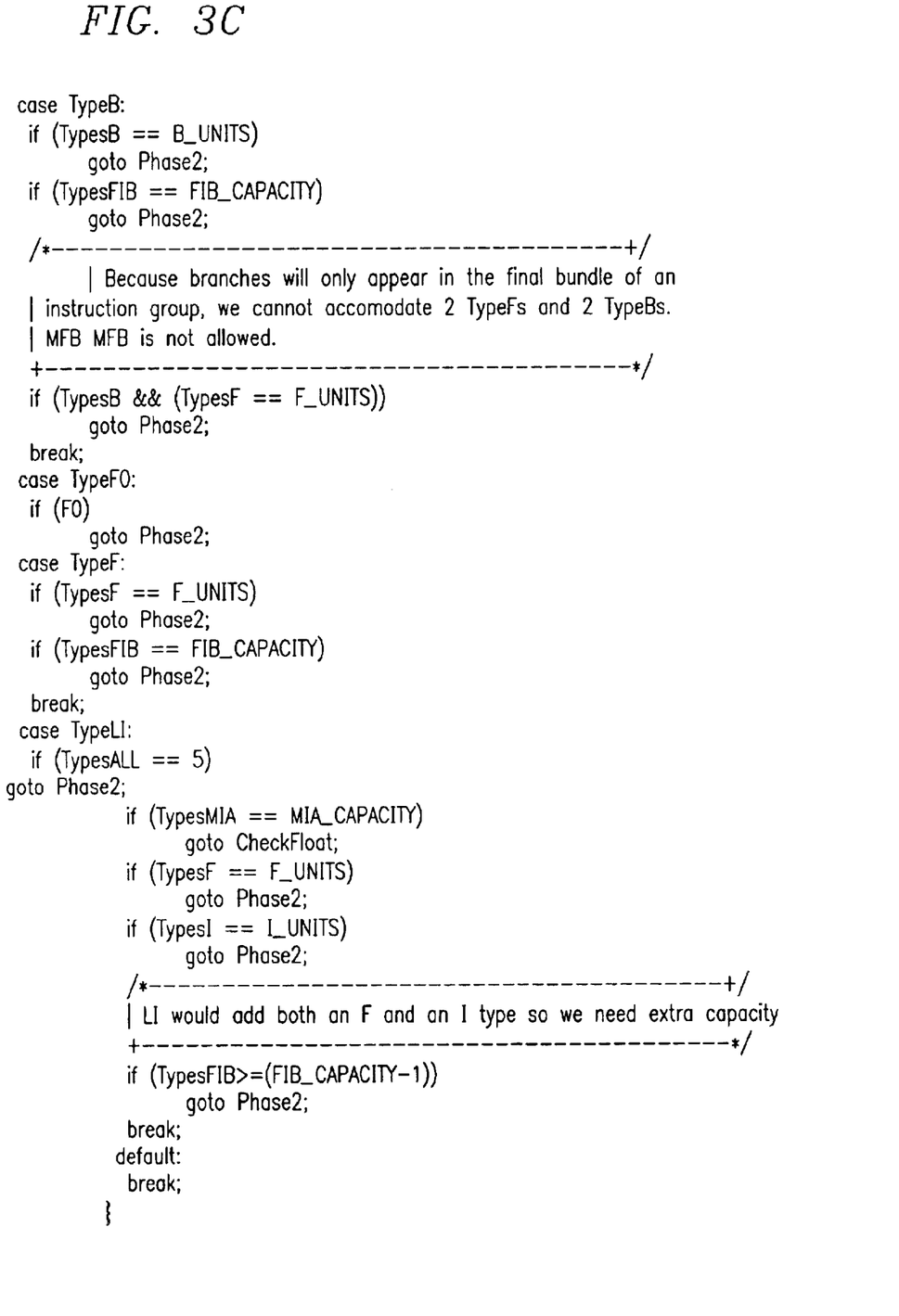
Figure 3D:
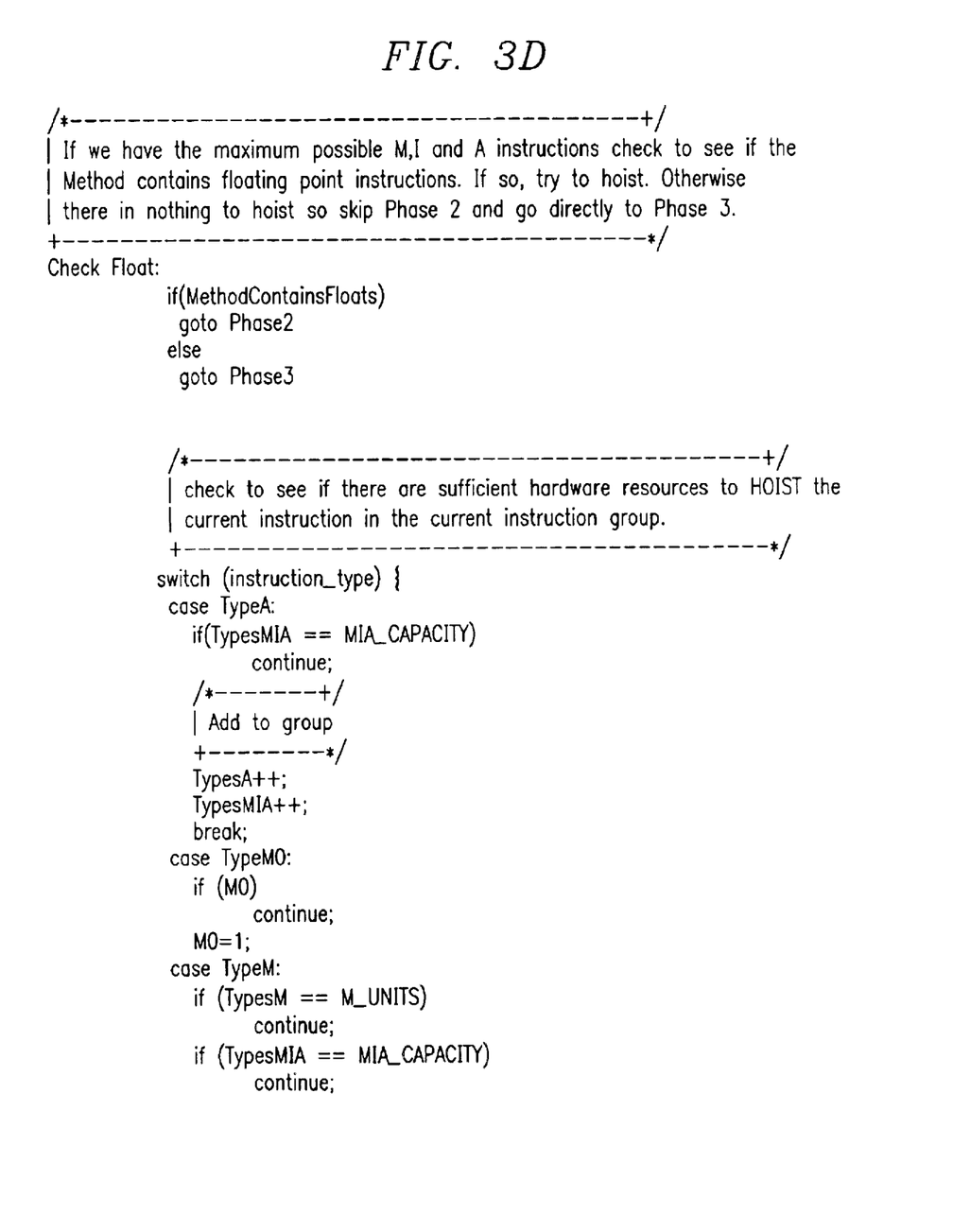
Figure 3E:
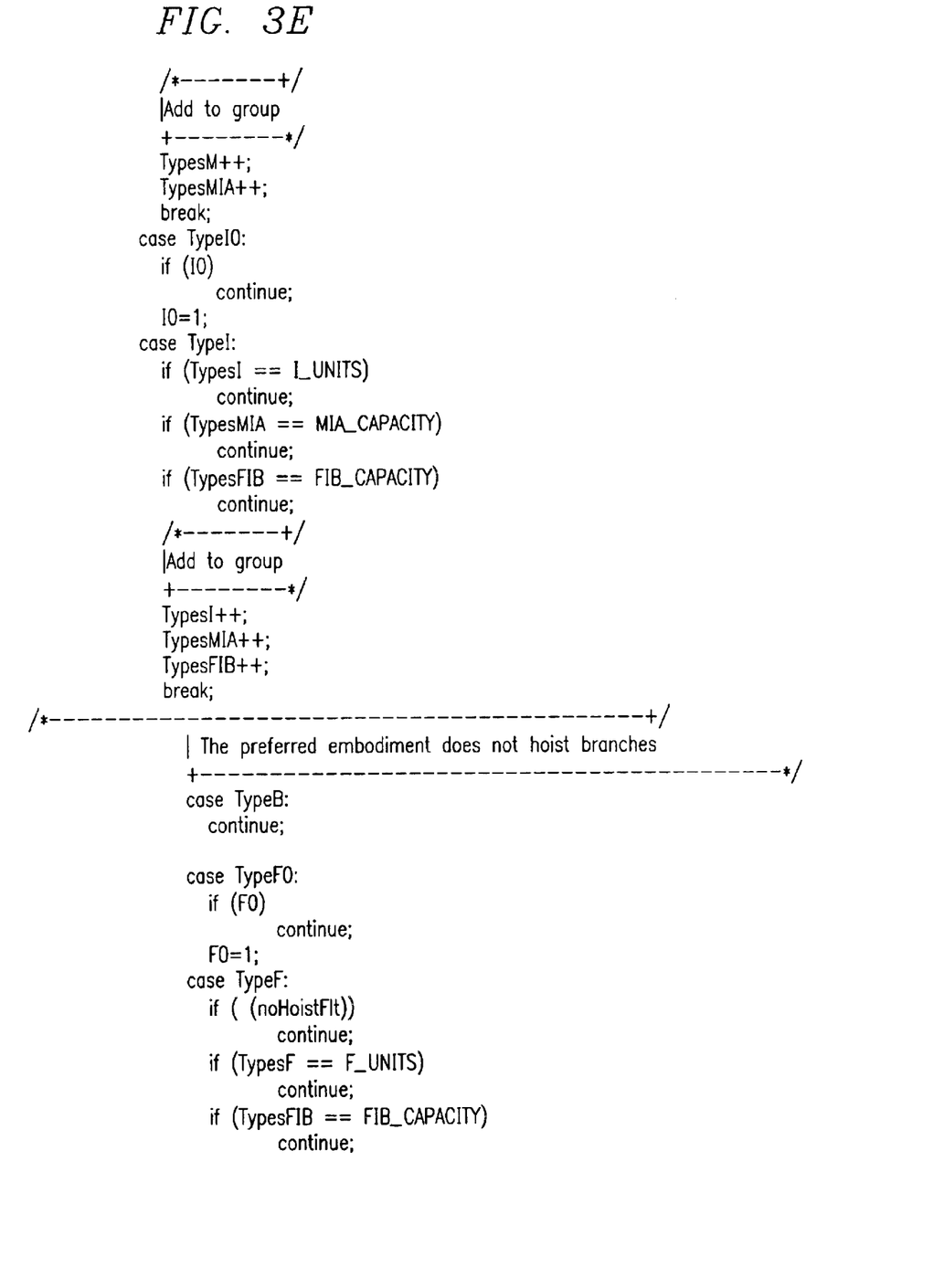
Figure 3F:
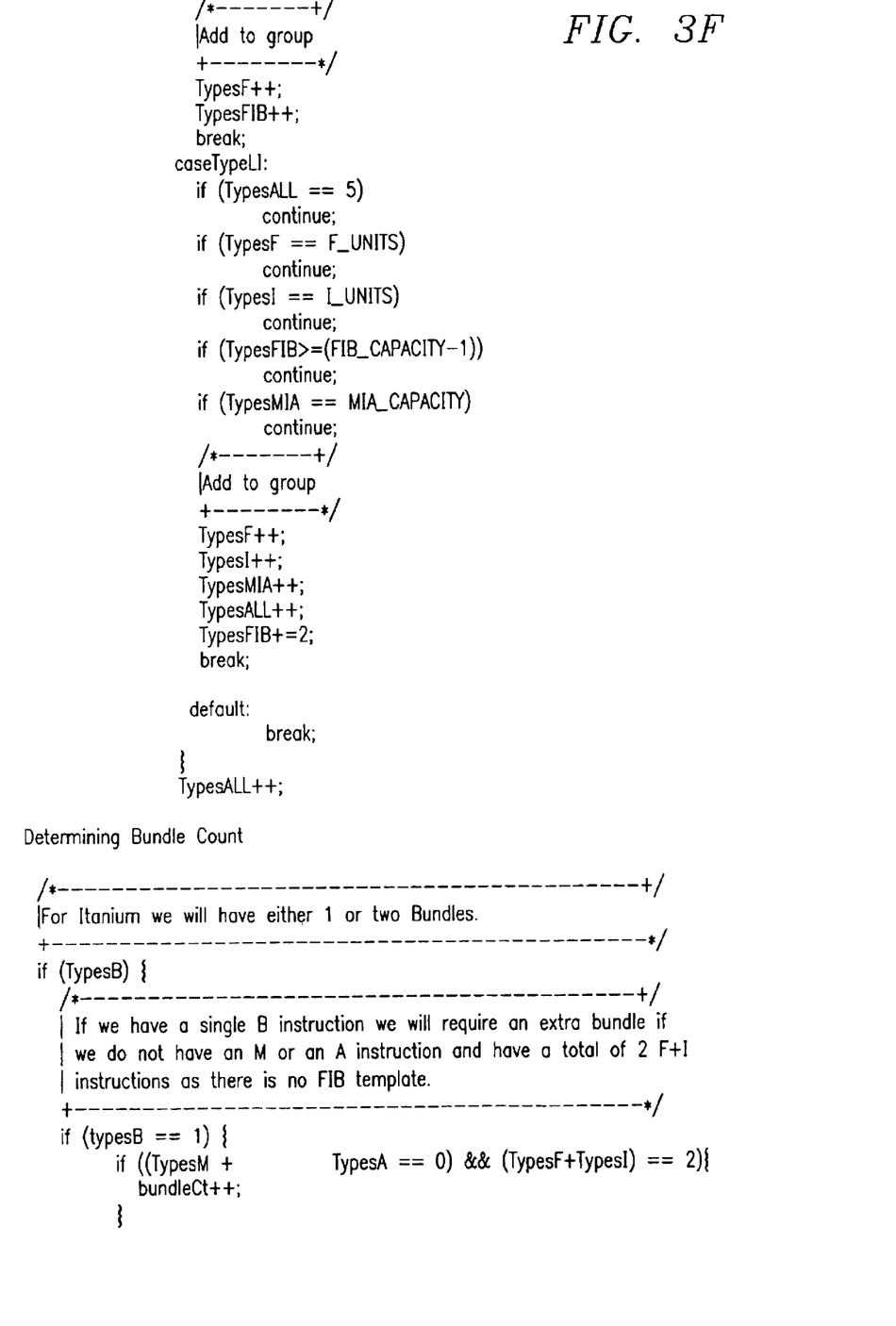
Figure 3G:
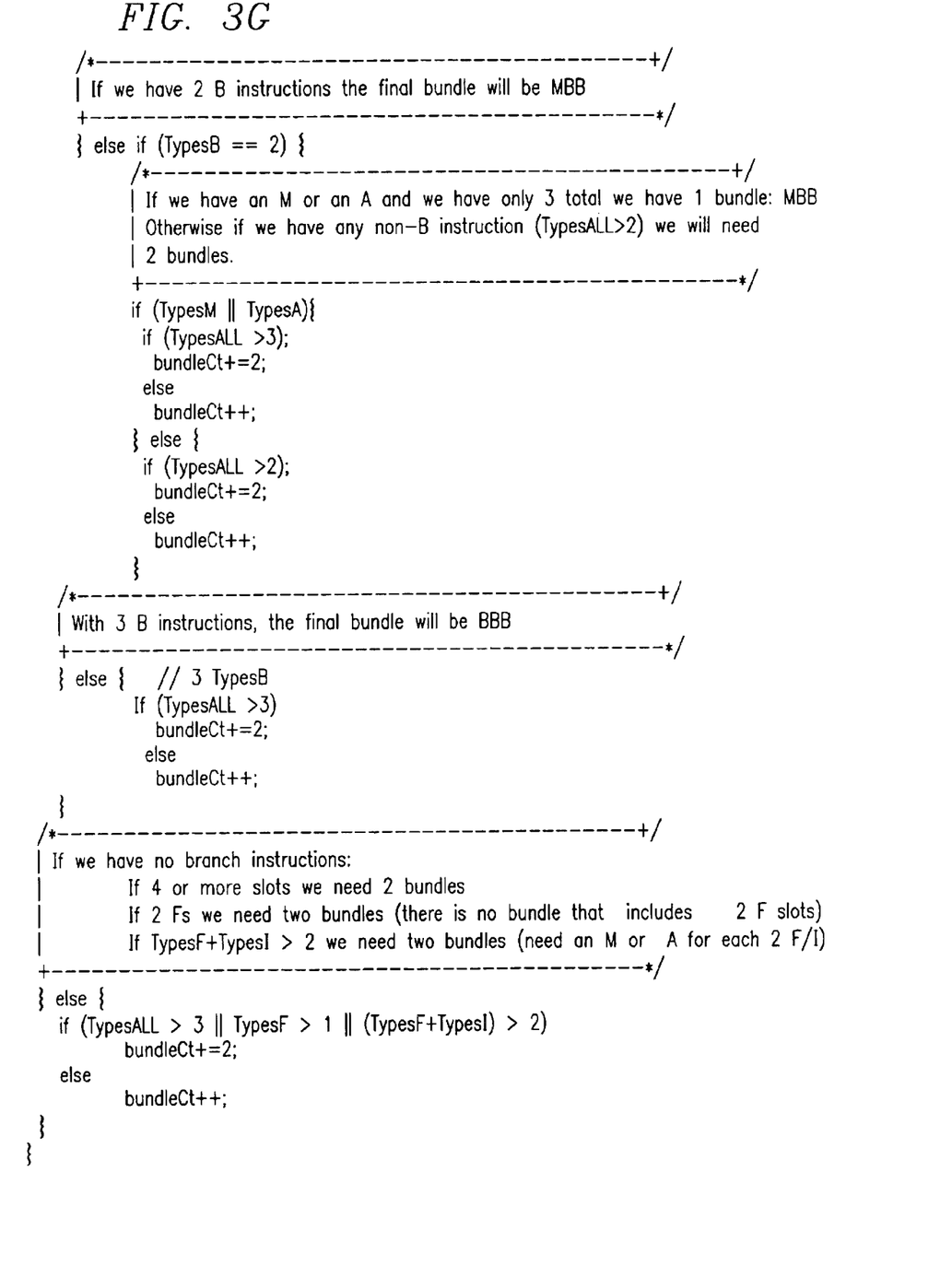

In phase 3, the number of bundles is determined based on the hardware resource counters developed in Phase 1 and 2. The algorithm used for Itanium to determine the bundle count is detailed in FIGS. 3F–3G.

Thus, the present invention provides a mechanism for creating instruction groups in view of the number of each type of execution unit available and the number of bundles that can be concurrently dispatched using the present architecture. In addition, the present invention takes into consideration the instruction groupings supported by the architecture in determining how to group the instructions in the intermediate instruction stream to maximize the efficiency of the parallel execution of these instructions.

FIGS. 3A–3G are exemplary diagrams of pseudo-code for performing the above described instruction group creation operation for the Itanium implementation of an IA64 architecture. As shown in FIGS. 3A–3G, the pseudo-code includes each of the three phases described above. The particular limits and thresholds shown in FIGS. 3A–3G are for illustration purposes only and are not intended to imply any particular limitations to the present invention.

Moreover, the particular pseudo-code shown in FIGS. 3A–3G is for an Itanium implementation. When applying the present invention to other implementations of the IA64 architecture or when applying it to other explicitly parallel architectures, the order of execution of the instructions may be different than that shown. Further, additional instructions may be included in the actual implementations of the present invention in addition to or in place of the instructions shown in FIGS. 3A–3G, based on the particular architecture in which the present invention is implemented.

Figure 4:
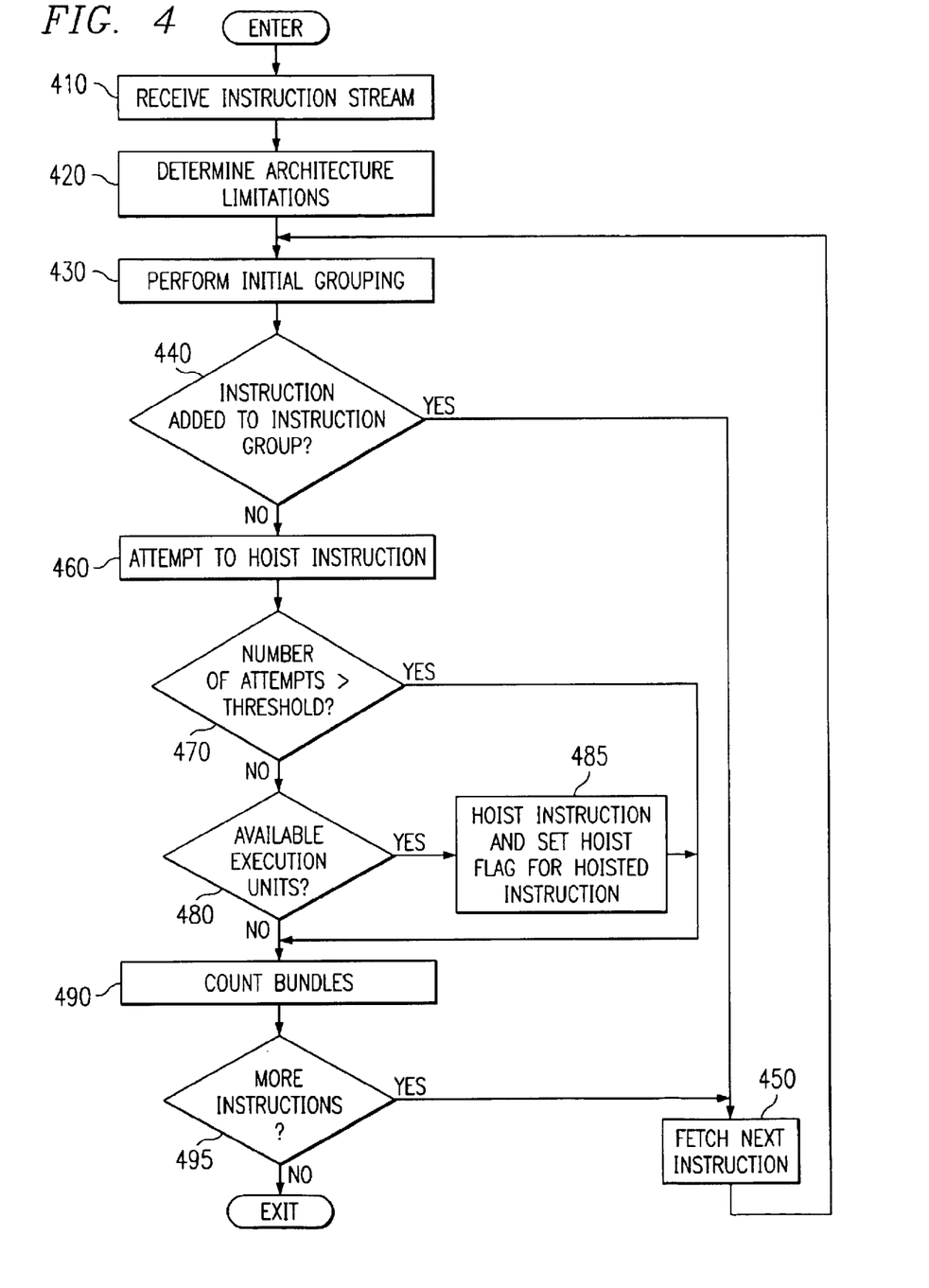
FIG. 4 is a flowchart outlining an exemplary operation of the present invention.

FIG. 4 is a flowchart outlining an exemplary operation of the present invention. As shown in FIG. 4, the operation starts with receiving an instruction stream (step 410). The architectural limits are then determined (step 420). Initial grouping is performed (step 430) and it is determined whether the instruction is added to the current instruction group (step 440).

If the instruction is added, the next instruction is fetched (step 450) and the operation repeats at step 430. If the instruction is not added, an attempt is made to hoist an instruction from further down in the program instruction order (step 460). It is then determined if the number of hoist attempts has exceeded a predetermined threshold (step 470). If so, the operation jumps to step 490. Otherwise, a determination is made as to whether there are any available execution units (step 480).

If there are, the instruction is hoisted and the hoist flag for the hoisted instruction is set (step 485). If there are no available execution units or if the number of hoist attempts exceeds a predetermined threshold, the number of bundles created is counted (step 490). Thereafter, a determination is made as to whether there are additional instructions in the instruction stream. If so, the operation continues to step 450 and the operation is repeated. If not, the operation ends.

Thus, the present invention provides an apparatus and method for creating instruction groups in view of architectural resource limitations. The present invention further takes into consideration the instruction groups supported by the architecture.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for creating instruction groups, comprising:
   receiving, in the data processing system, an instruction stream having an instruction;
   determining, in the data processing system, architectural limitations for the creation of instruction groups of the data processing system; and
   grouping, in the data processing system, the instruction into an instruction group based on the architectural limitations.

2. The method of claim 1, wherein the architectural limitations include at least one of a number of each type of execution unit available and a number of bundles that can be dispatched concurrently by the architecture.

3. The method of claim 1, wherein grouping the instruction includes determining if there are any available execution units and determining if a dispersal window is full.

4. The method of claim 3, wherein if there are no available execution units or the dispersal window is full, the instruction is not added to the instruction group.

5. The method of claim 3, wherein if there are execution units available, the method further comprises determining if there is a hardware dependency that precludes the instruction from being executed in parallel with other instructions in the instruction group.

6. The method of claim 5, wherein the hardware dependency is a read after write dependency.

7. The method of claim 5, wherein determining if there is a hardware dependency includes using a byte array and an instruction group counter to identify hardware dependencies.

8. The method of claim 7, wherein the byte array is cleared at the beginning of compilation and when the instruction group counter wraps to 0 at which point the instruction group counter is set to 1 after clearing, and wherein when each new instruction group is encountered, the instruction group counter is incremented and when a target register is encountered, during use of the byte array, the corresponding byte is set to the instruction group counter.

9. The method of claim 8, wherein when a source register is encountered, during use of the byte array, a check is made to see if the corresponding byte is equal to the instruction group counter and if equal, the instruction is excluded from the current instruction group.

10. The method of claim 4, further comprising hoisting another instruction from further down in the instruction stream into the instruction group if the instruction is not added to the instruction group.

11. The method of claim 10, wherein hoisting another instruction includes determining if an invoke boundary is crossed by hoisting the another instruction and, if an invoke boundary is crossed, the another instruction is not hoisted into the instruction group.

12. The method of claim 11, wherein if the another instruction is not hoisted into the instruction group, a hoist flag is set to identify the instruction group having attempted to hoist the instruction.

13. The method of claim 1, further comprising counting a number of instruction bundles in the instruction group.

14. An apparatus for creating instruction groups, comprising:
   means for receiving an instruction stream having an instruction;
   means for determining architectural limitations for the creation of instruction groups; and
   means for grouping the instruction into an instruction group based on the architectural limitations.

15. The apparatus of claim 14, wherein the architectural limitations include at least one of a number of each type of execution unit available and a number of bundles that can be dispatched concurrently by the architecture.

16. The apparatus of claim 14, wherein the means for grouping the instruction includes means for determining if there are any available execution units and means for determining if a dispersal window is full.

17. The apparatus of claim 16, wherein if there are no available execution units or the dispersal window is full, the means for grouping the instruction does not add the instruction to the instruction group.

18. The apparatus of claim 16, wherein the apparatus further comprises means for determining if there is a hardware dependency that precludes the instruction from being executed in parallel with other instructions in the instruction group if there are execution units available.

19. The apparatus of claim 18, wherein the hardware dependency is a read after write dependency.

20. The apparatus of claim 18, wherein the means for determining if there is a hardware dependency includes means for using a byte array and an instruction group counter to identify hardware dependencies.

21. The apparatus of claim 20, wherein the byte array is cleared at the beginning of compilation and when the instruction group counter wraps to 0 at which point the instruction group counter is set to 1 after clearing, and wherein when each new instruction group is encountered, the instruction group counter is incremented and when a target register is encountered, during use of the byte array, the corresponding byte is set to the instruction group counter.

22. The apparatus of claim 21, wherein when a source register is encountered, during use of the byte array, a check is made to see if the corresponding byte is equal to the instruction group counter and if equal, the instruction is excluded from the current instruction group.

23. The apparatus of claim 17, further comprising means for hoisting another instruction from further down in the instruction stream into the instruction group if the instruction is not added to the instruction group.

24. The apparatus of claim 23, wherein the means for hoisting another instruction includes means for determining if an invoke boundary is crossed by hoisting the another instruction, and wherein if an invoke boundary is crossed, the means for hoisting another instruction does not hoist the another instruction into the instruction group.

25. The apparatus of claim 24, wherein if the another instruction is not hoisted into the instruction group, the means for hoisting sets a hoist flag to identify the instruction group having attempted to hoist the instruction.

26. The apparatus of claim 14, further comprising means for counting a number of instruction bundles in the instruction group.

27. A computer program product in a computer readable medium for creating instruction groups, comprising:
   first instructions for receiving an instruction stream having an instruction;
   second instructions for determining architectural limitations for the creation of instruction groups; and
   third instructions for grouping the instruction into an instruction group based on the architectural limitations.

28. The computer program product of claim 27, wherein the architectural limitations include at least one of a number of each type of execution unit available and a number of bundles that can be dispatched concurrently by the architecture.

29. The computer program product of claim 27, wherein the third instructions for grouping the instruction includes instructions for determining if there are any available execution units and means for determining if a dispersal window is full.

30. The computer program product of claim 28, wherein if there are no available execution units or the dispersal window is full, the third instructions for grouping the instruction do not add the instruction to the instruction group.

31. The computer program product of claim 29, further comprises fourth instructions for determining if there is a hardware dependency that precludes the instruction from being executed in parallel with other instructions in the instruction group if there are execution units available.

32. The computer program product of claim 31, wherein the hardware dependency is a read after write dependency.

33. The computer program product of claim 31, wherein the fourth instructions for determining if there is a hardware dependency includes instructions for using a byte array and an instruction group counter to identify hardware dependencies.

34. The computer program product of claim 33, further comprising instructions for clearing the byte array at the beginning of compilation and when the instruction group counter wraps to 0 at which point the instruction group counter is set to 1 after clearing, and instructions for, when each new instruction group is encountered, incrementing the instruction group counter and instructions for, when a target register is encountered, during use of the byte array, setting the corresponding byte to the instruction group counters.

35. The computer program product of claim 34, further comprising instructions for, when a source register is encountered, during use of the byte array, making a check to see if the corresponding byte is equal to the instruction group counter and if equal, excluding the instruction from the current instruction group.

36. The computer program product of claim 30, further comprising fourth instructions for hoisting another instruction from further down in the instruction stream into the instruction group if the instruction is not added to the instruction group.

37. The computer program product of claim 36, wherein the fourth instructions for hoisting another instruction includes instructions for determining if an invoke boundary is crossed by hoisting the another instruction, and instructions for, if an invoke boundary is crossed, not hoist the another instruction into the instruction group.

38. The computer program product of claim 37, further comprising instructions for, if the another instruction is not hoisted into the instruction group, setting a hoist flag to identify the instruction group having attempted to hoist the instruction.

39. A method, in a data processing system, for creating instruction groups, comprising:

receiving an instruction stream having one or more instructions;

automatically determining architectural limitations for the creation of instruction groups; and dynamically grouping the one or more instructions into one or more instruction groups based on the architectural limitations.

* * * * *